PROCESS FOR PRODUCING POLYTETRAHALOETHYLENE FILMS

Filed Nov. 16, 1948

HENRY F. PUPPOLO
INVENTOR.

BY Arthur G. Connolly
his attorney

Patented Feb. 6, 1951

2,540,962

UNITED STATES PATENT OFFICE 2,540,962

PROCESS FOR PRODUCING POLYTETRA-HALOETHYLENE FILMS

Henry F. Puppolo, North Adams, Mass., assignor to Sprague Electric Company, North Adams, Mass., a corporation of Massachusetts Application November 16, 1948, Serial No. 60,338

7 Claims. (Cl. 18—57)

This invention relates to a process for producing thin films of plastic materials and, more specifically, refers to a process for producing thin films of resins which are not soluble or moldable under ordinary conditions.

Polytetrafluoroethylene is an unusual resin, possessing flexibility, extreme solvent resistance, excellent dielectric properties and, generally, exceptional physical and chemical stability. It is, therefore, very useful in many applications where organic resins were heretofore unsatisfactory. Unfortunately, however, it is very difficult to mold, form and extrude. Since it is not soluble in the ordinary solvents or capable of extrusion, the preparation of thin films thereof has heretofore been accomplished by shaving a film from a massive block or cylinder of the material. It is difficult to obtain uniform film thicknesses by this method and, at best, the thickness of the film is greater than 0.001″. Films of such thickness are not particularly useful in the manufacture of electrical condensers, which normally employ dielectric spacers of thicknesses on the order of 0.0003″. For low voltage operations it is not necessary to employ dielectric thicknesses greater than 0.0005″, particularly with a material of high breakdown voltage, such as polytetrafluoroethylene.

It is an object of the present invention to overcome the foregoing and related disadvantages of prior art procedures. A further object is to produce very thin, impervious films of polytetrahaloethylene resins by a simple process. Additional objects will become apparent from the following description and claims.

These objects are attained in accordance with the present invention by utilizing a process which comprises depositing a mixture of polytetrahaloethylene resin particles and a volatilizable compound containing a hydroxyl group upon a smooth surface of a metal selected from the class containing iron and copper, heating the metal surface and mixture deposited thereon to a temperature between about 300° C. and about 400° C., cooling them, and then stripping off from the underlying metal surface the film of sintered resin particles so formed. In a more restricted sense, the invention is concerned with a process for producing films of polytetrafluoroethylene which comprises depositing a suspension of particles of polytetrafluoroethylene in a liquid medium which will react with copper between about 100° C. and 400° C. upon a flexible copper sheet, heating the so coated sheet to a temperature between about 325° C. and about 400° C.

for a period between about 5 seconds and about 10 minutes, cooling the resultant laminated sheet, and then stripping off from the underlying copper sheet the film of sintered polytetrafluoroethylene particles, that is formed. In one of its preferred embodiments, the invention is concerned with a process for producing films of polytetrafluoroethylene of a thickness less than about 0.001″, which comprises depositing an aqueous suspension of particles of polytetrafluoroethylene upon a clean, flexible copper sheet, said particles being less than about 50 microns in diameter, heating the so coated sheet to about 350° C. for about 1 minute, cooling the resultant laminated sheet, and then stripping off from the underlying copper sheet the thin film of sintered polytetrafluoroethylene particles, that is formed.

I have discovered that it is possible to prepare very thin, uniform films of polytetrahaloethylene resins by producing them under conditions such that the film may readily be stripped from the base material upon which it is formed. This involves depositing a mixture of particles of the resin and a volatilizable material, preferably liquid, containing hydroxy groups upon a clean, flat surface of copper or iron. The base and deposited layer are then heated to a temperature at which the resin particles are sintered together, while the hydroxy-group-containing compound is removed by volatilization and/or reaction. I am not fully aware of the role played by the volatilizable, hydroxy-group-containing compound, but it apparently reacts with the metal base to produce a weak, unbonded thin oxide film to which the sintered resin particles and/or the base metal do not adhere. Alternately or in addition thereto it may produce, at or below the sintering temperature, a thin, gaseous cushion between the resin and the base, preventing bonding therebetween. In any event, I have found that the presence of the volatilizable, hydroxy group containing compound in the resin layer to be treated leads to the formation of desirable films that may be stripped from the metal base without tearing or appreciable stretching. While I have specified water as a preferred material, other volatilizable, hydroxy - group - containing compounds, preferably liquid, may be employed alone or in admixture with water. Representative of the materials that may be used are methyl alcohol, ethyl alcohol, ethylene glycol, glycerin, acetic acid, propanoic acid, caprylic acid, malonic acid, ethanol amine, etc.

The resin is preferably a polytetrahaloethylene resin, such as polytetrafluoroethylene, polytrifluorochloroethylene, and polytetrachloroethylene. However, the invention may be practiced with other similar resinous materials, if so desired. The particles of the resin are preferably suspended in a suitable liquid medium, which contains one or more hydroxy-group-containing compounds, such as water, ethyl alcohol or mixtures of these. The suspension may be produced by polymerizing the monomeric material in the medium or by milling particles of the resin into the medium with the aid of a dispersing agent, such as sodium lauryl sulfate. In most cases, it is preferable to employ resin particles of a diameter not greater than 50 microns. The sintering of the resin particles and volatilization of other constituents not previously removed may be effected between 300° C. and 400° C.

It will be noted that the hydroxy material to be deposited along with the resin particles and the liquid suspension medium preferably employed are generally the same or similar compounds. This is desirable, but need not always hold true. An emulsion of water and benzene, holding resin particles in suspension, may be employed, for example. When they differ, the hydroxy compound should have a higher volatilization point than the boiling point of the suspension medium, as a general rule. The preferred embodiment of the invention is concerned with the use of water both for suspending the resin particles and for making the film formed readily removable from the base.

The surface of the base should be smooth and be composed of clean metal, and the base is preferably flexible, so that the process may be carried out on a continuous basis. Suitable metals are those which readily oxidize, such as iron and copper. The latter metal has been found to be particularly satisfactory for the process of the invention. Prior to the coating of the metal surface with the resin particles and other constituents of the mixture, the metal surface should be cleaned to remove any oil, dirt and loose oxide scale. Acid cleaning is satisfactory for this purpose.

Following the sintering of the resin particles and volatilization and/or reaction of other constituents, the resin film may be stripped from the underlying base and wound on a suitable spool or form adherent oxide particles may be removed by treatment with acid. The film will be thin, tough and flexible.

Reference is now made to the appended drawing, in which

Figures 1, 2:
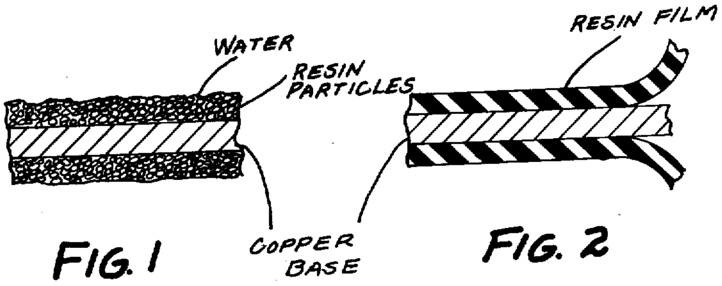
Figure 1 shows a copper base with a coating or resin particles and water.
Figure 2 shows the film of sintered resin particles, partially removed from the base.
Figure 3:
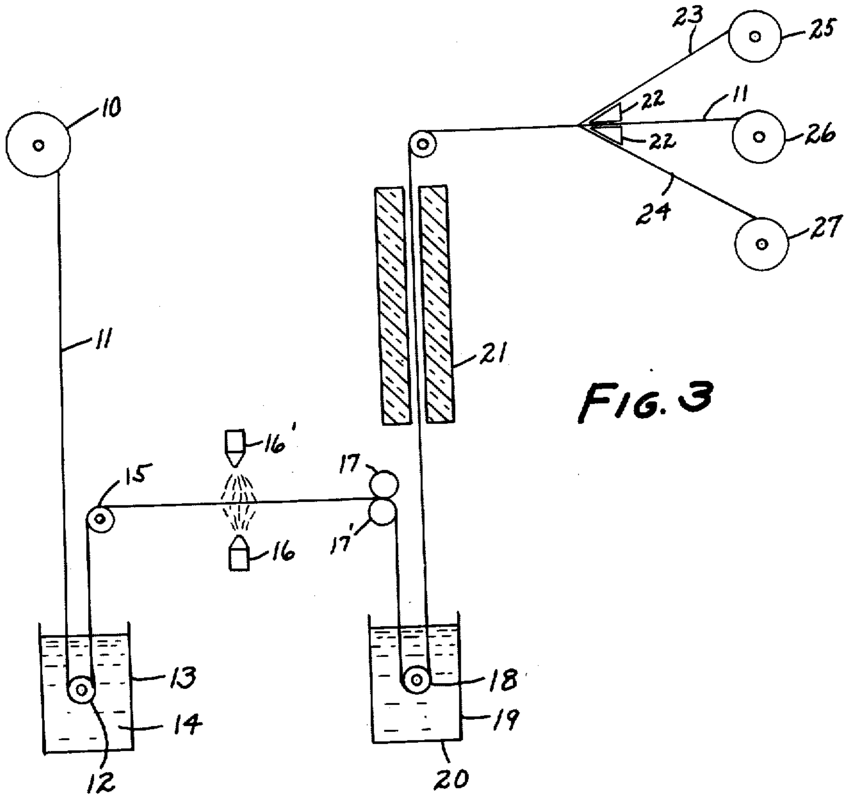

Figure 3 is a schematic diagram of the process of the invention. A sheet of copper 11 is unrolled from spool 10 and passes under reversing pulley 12 in a cleaning cell 13. Acid 14 is contained therein to clean the surface of the copper sheet. Thereafter, the sheet passes over pulley 15 and between washing nozzles 16 and 16′. These nozzles spray water onto sheet 11 to wash off and remove any residual acid. The sheet then passes over pulley 17 into a coating cell 19, and under reversing pulley 18. Cell 19 contains a dispersion or suspension 20 of fine polytetrahaloethylene particles in water. The particles and water deposit on the sheet 11. Thereafter, the so coated sheet immediately passes through oven 21 which is heated to a temperature sufficient to sinter the particles of resin together. At the same time, most of the water is boiled away, while a minor amount apparently reacts with the copper base, as heretofore described. The laminated sheet formed then passes through stripping tool 22 which separates the copper sheet 11 from the resin films 23 and 24 which have been produced thereon. The resin films 23 and 24 are wound on spools 25 and 27, respectively, while the copper sheet is wound on spool 26 or returned to spool 10 as a continuous strip.

If copper or iron oxide particles should adhere to the film, they may be removed by treatment with acid, which dissolves the oxide but does not affect the inert resin film.

As a specific example, a smooth copper base was cleaned in chromic acid, washed in water, dipped in an aqueous suspension containing 55% by weight of polytetrafluoroethylene particles having a diameter less than about 20 microns. The base was removed from the suspension, with a thin coating of resin particles and water, and then immediately heated to about 370° C. for 4 minutes. After cooling, the resin film was readily lifted from the surface of the copper base. It was clear, flexible and tough. Its thickness was about 0.0002″. Heavier coatings and hence thicker films may be produced by increasing the resin content of the suspension and/or by increasing the resin particle size.

The time and temperature of heating are interdependent, as well as dependent upon the particular resin to be treated. As a general rule, temperatures between about 300° C. and about 400° C. are suitable for the polytetrahaloethylene resins, with sintering times varying between about 5 seconds and about 10 minutes.

The films of the invention are very useful as dielectric spacers for electrical condensers, combining the desirable properties of flexibility, inertness, low loss and temperature resistance without the thickness associated with prior polytetrahaloethylene films.

As many widely different embodiments of my invention may be made without departing from the spirit and scope hereof, it is to be understood that it is not limited to the specific embodiments hereof except as defined in the appended claims.

I claim:

1. A process for producing films of polytetrahaloethylene resins less than 0.0001 inch thick, which process comprises depositing a mixture of polytetrahaloethylene resin particles less than 50 microns in diameter and a volatilizable liquid compound containing a hydroxy group upon a smooth surface of a sheet of metal selected from the class consisting of iron and copper, heating the metal surface and the mixture deposited thereon to a temperature between about 300° C. and about 400° C. for at least about 5 seconds to sinter the resin particles together, cooling them, and then stripping off from the underlying metal surface the film of sintered resin particles so formed.

2. A process for producing thin films of polytetrafluoroethylene which comprises dipping a smoothly surfaced sheet of a metal selected from the class consisting of copper and iron, in a suspension of particles of polytetrafluoroethylene resin less than 50 microns in diameter in a liquid, volatile compound containing a hydroxy group to coat the sheet with a layer of said suspension, heating the so coated sheet to a temperature between about 325° C. and about 400° C. for a period between about 5 seconds and about 10 minutes to sinter the particles together, cooling the resultant laminated sheet, and then stripping off from the underlying copper sheet the film of sintered polytetrafluoroethylene particles, that is formed.

3. A process for producing thin films of polytetrafluoroethylene of a thickness less than about 0.001", which comprises depositing an aqueous suspension of particles of polytetrafluoroethylene upon a clean, flexible copper sheet, said particles being less than about 50 microns in diameter, immediately heating the so coated sheet to about 350° C. for about 1 minute, cooling the resultant laminated sheet, and then stripping off from the underlying copper sheet the thin film of sintered polytetrafluoroethylene particles, that is formed.

4. The process as defined by claim 1 in which the smooth surface is a copper surface.

5. A process for producing thin films of polytetrahaloethylene resin which comprises depositing a mixture of polytetrahaloethylene resin particles and a volatilizable compound containing a hydroxy group upon a smooth surface of a metal selected from the class consisting of iron and copper, heating the metal surface and the mixture deposited thereon to a temperature between about 300° C. and about 400° C. for at least about five seconds to sinter the resin particles together, cooling them, and then stripping off from the underlying metal surface the film of sintered resin particles so formed, the above sequence of steps being entirely carried out at substantially atmospheric pressure.

6. A process for producing thin films of polytetrahaloethylene resins which comprises dipping a smooth sheet of a metal of the class consisting of copper and iron into a suspension of polytetrafluoroethylene particle less than 50 microns in diameter in a liquid volatile compound that contains a hydroxy group, to coat both sides of the sheet with the suspension, heating the coated sheet to volatilize the liquid and sinter the resin particles together into continuous films on each side of the sheet, cooling the resulting combination, and then stripping off both films from the sheet.

7. A continuous process for producing thin films of polytetrafluoroethylene, which comprises passing a smooth continuous sheet of a metal selected from the class consisting of iron and copper through a suspension of particles of polytetrafluoroethylene resin in a liquid volatile compound containing a hydroxy group, thus coating both sides of the sheet with a mixture of the resin particles and the liquid, then passing the so-coated sheet through a zone in which it is heated to a temperature between about 325° C. and about 400° C. for a period between about 5 seconds and about 10 minutes, thus volatilizing the liquid and sintering the resin particles, then passing the resultant laminated sheet through a zone in which it is cooled, and finally passing it through a device wherein the films of sintered polytetrafluoroethylene are continuously stripped off from the underlying metal sheet.

HENRY F. PUPPOLO.

REFERENCES CITED

The following references are of record in the file of this patent:

UNITED STATES PATENTS

| Number | Name | Date |
|---|---|---|
| 2,440,190 | Alfthan | Apr. 20, 1948 |
| 2,442,940 | Staudinger et al. | June 8, 1948 |